(12) United States Patent
Friedt

(10) Patent No.: US 8,392,128 B2
(45) Date of Patent: Mar. 5, 2013

(54) METHOD FOR QUERYING A PIEZOELECTRIC RESONATOR AND QUERYING DEVICE IMPLEMENTING SAID QUERYING METHOD

(75) Inventor: Jean-Michel Friedt, Besancon (FR)

(73) Assignee: Senseor, Valbonne (FR)

( * ) Notice: Subject to any disclaimer, the term of this patent is extended or adjusted under 35 U.S.C. 154(b) by 249 days.

(21) Appl. No.: 12/918,666

(22) PCT Filed: Feb. 19, 2009

(86) PCT No.: PCT/EP2009/051991
§ 371 (c)(1),
(2), (4) Date: Aug. 20, 2010

(87) PCT Pub. No.: WO2009/103769
PCT Pub. Date: Aug. 27, 2009

(65) Prior Publication Data
US 2010/0332157 A1  Dec. 30, 2010

(30) Foreign Application Priority Data
Feb. 22, 2008 (FR) ...................... 08 00967

(51) Int. Cl.
*G01L 1/00* (2006.01)
*G01L 1/16* (2006.01)
(52) U.S. Cl. .......................... 702/54; 702/56
(58) Field of Classification Search .................... 702/54, 702/56; 324/727, 76.49, 76.51, 629–648, 324/652; 310/311, 313 A, 320, 321, 322, 310/334
See application file for complete search history.

(56) References Cited

U.S. PATENT DOCUMENTS

| 6,943,484 | B2 * | 9/2005 | Clark et al. ................... 310/334 |
| 7,421,321 | B2 * | 9/2008 | Breed et al. .................. 701/33.6 |
| 2005/0056098 | A1 | 3/2005 | Solie | |
| 2006/0123913 | A1 | 6/2006 | Marsh | |

FOREIGN PATENT DOCUMENTS
WO  93/20422  10/1993

* cited by examiner

*Primary Examiner* — Sujoy Kundu
(74) *Attorney, Agent, or Firm* — Baker & Hostetler LLP

(57) ABSTRACT

A method for interrogating a passive sensor comprising at least one piezoelectric resonator includes the following steps:
the identification of the characteristic width of the resonant frequency band of the resonator;
the determination of a scan interval equal to a third of the measured bandwidth;
a first series of three interrogation measurements with signals respectively at a first frequency, at a second frequency and at a third frequency making it possible to define a first resonance value, a second resonance value and a third resonance value;
the determination by a parabolic fitting operation of the resonator response curve on the basis of said first, second and third resonance values, so as to calculate a first value of the frequency in real time of the resonator.
The invention also relates to an electronic device for interrogating a passive sensor comprising at least one piezoelectric resonator and comprising a micro-controller implementing the interrogation method of the invention.

9 Claims, 5 Drawing Sheets

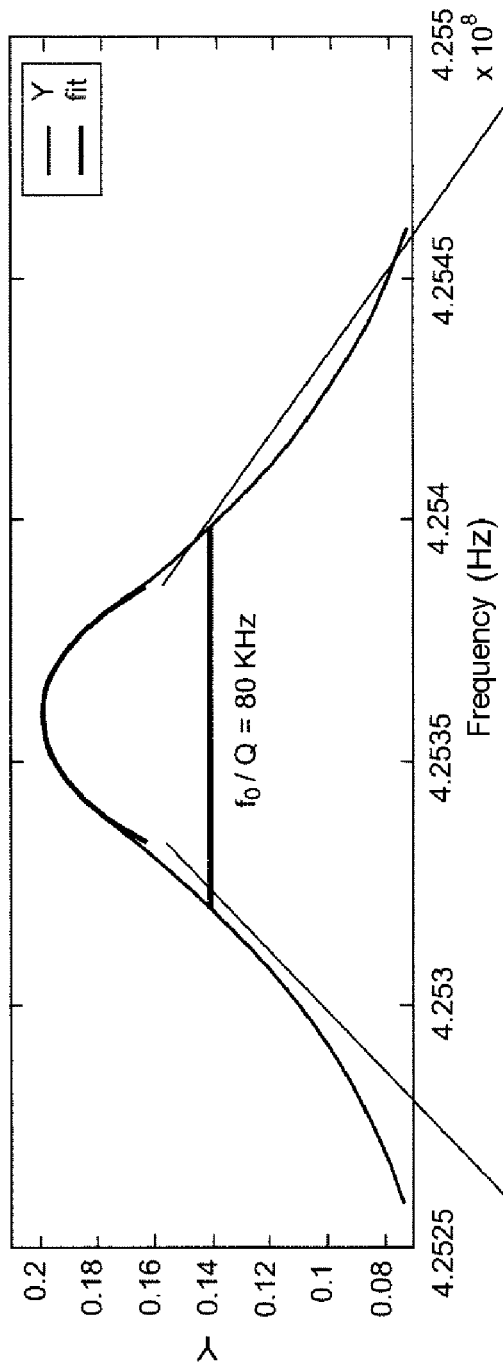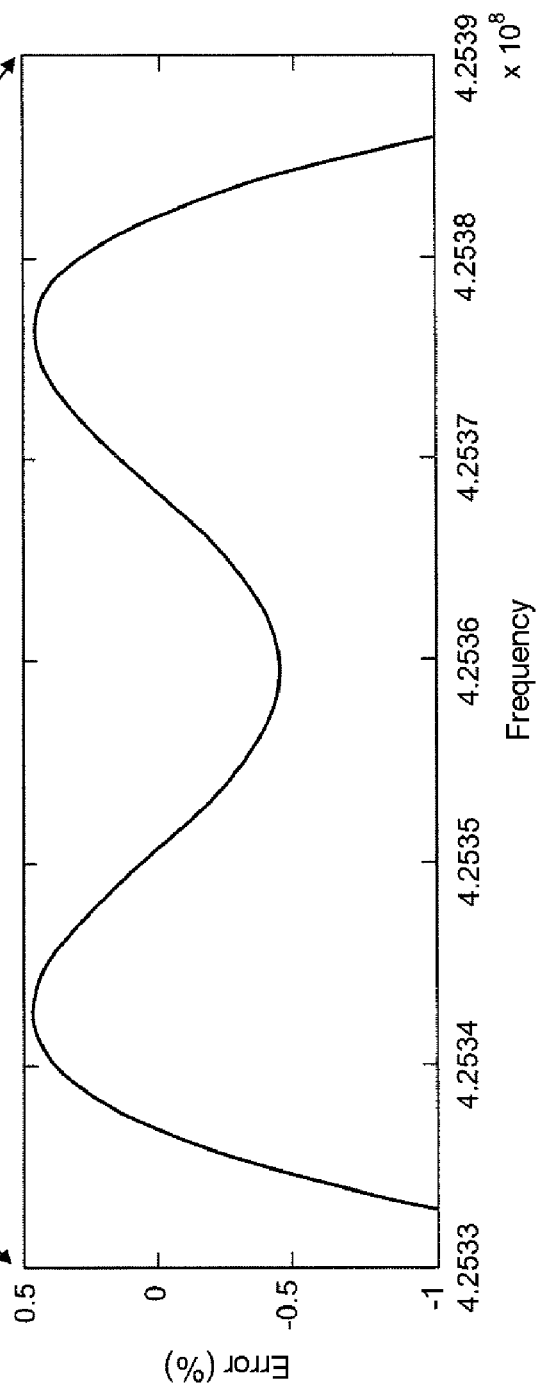

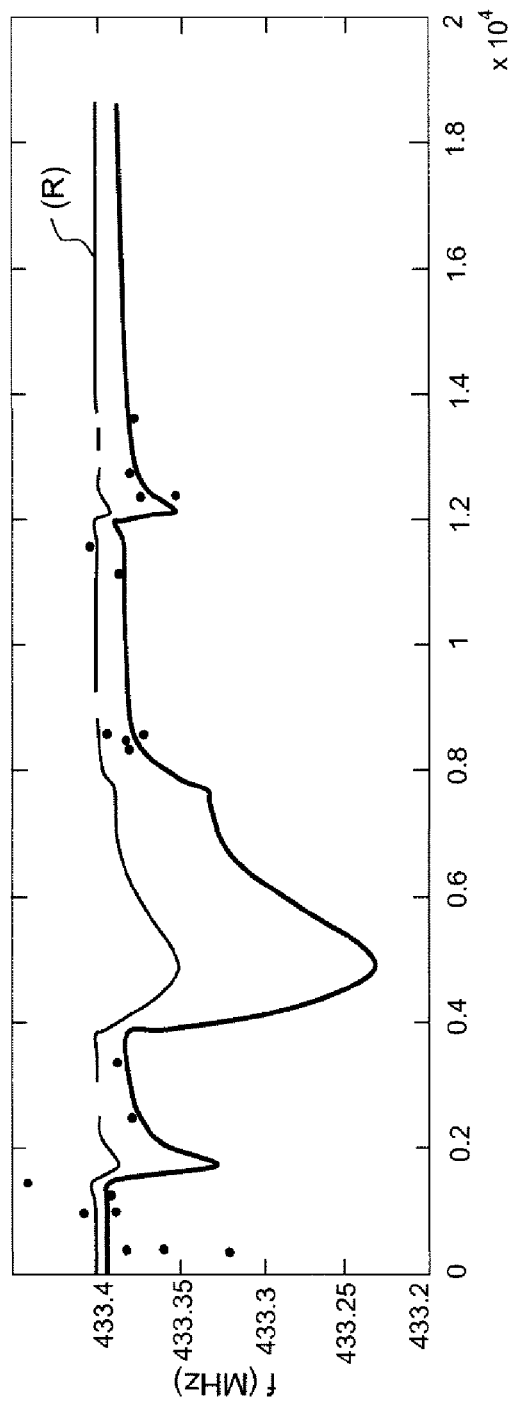
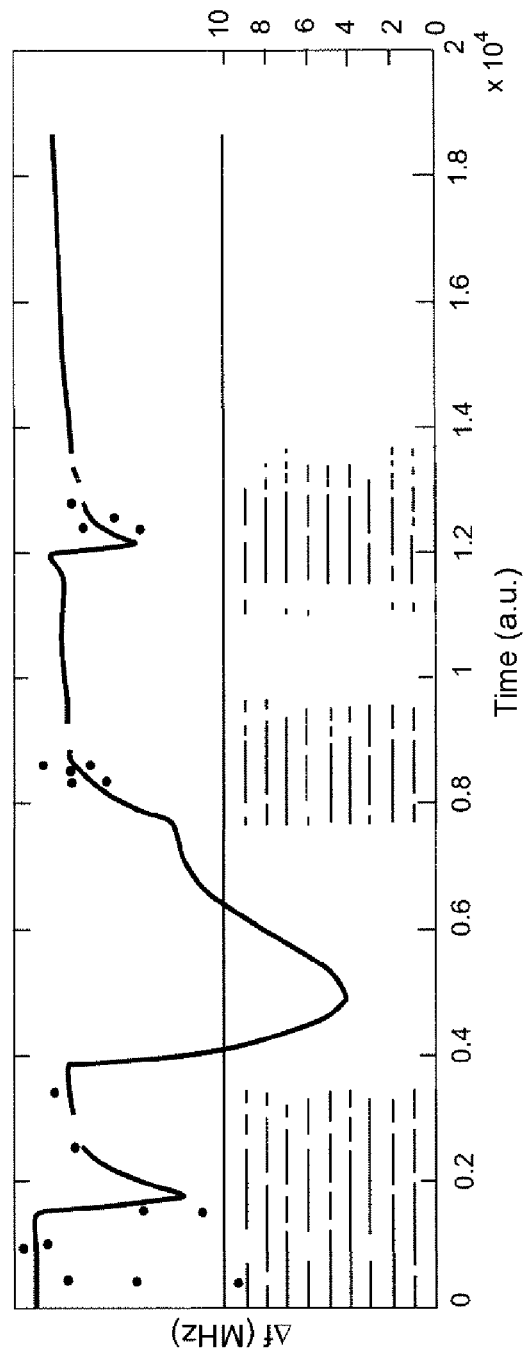
FIG.6a
FIG.6b

METHOD FOR QUERYING A PIEZOELECTRIC RESONATOR AND QUERYING DEVICE IMPLEMENTING SAID QUERYING METHOD

CROSS-REFERENCE TO RELATED APPLICATIONS

This application is a National Stage of International patent application PCT/EP2009/051991, filed on Feb. 19, 2009, which claims priority to foreign French patent application No. FR 08 00967, filed on Feb. 22, 2008, the disclosures of which are incorporated by reference in their entirety.

FIELD OF THE INVENTION

The field of the invention is that of interrogation devices for passive sensors and notably for surface acoustic wave sensors.

BACKGROUND OF THE INVENTION

These sensors are known for their use for example as temperature or pressure sensors and generally comprise at least one resonator comprising a micro-structure deposited on the surface of a piezoelectric substrate. An exemplary sensor can typically comprise two interdigital electrode comb transducers placed between reflecting gratings. The reflecting gratings behave like mirrors and there therefore exist resonant frequencies for which the return path in the cavity is equal to an integer number of wavelengths. The resonant modes for these frequencies are excited by the transducer placed between the mirrors.

This type of sensor can be interrogated remotely, by connecting the input of the transducer to an RF radiofrequency antenna. When the antenna receives an electromagnetic signal, the latter gives rise to waves on the surface of the substrate which are themselves reconverted into electromagnetic energy on the antenna. Thus, the device consisting of an assembly of resonators connected to an antenna has a response at the resonant frequencies of the resonators that it is possible to measure remotely. Thus, remotely interrogatable sensors can be produced. This possibility is a significant advantage of surface acoustic waves and can be used notably within the framework of tire pressure sensors. It is indeed beneficial in this type of application to be able to place the sensor in the tire whereas the interrogation electronics are on board the vehicle.

According to the known art, remote interrogation systems use interrogation signals in the form of pulses (typically with a period of about 25 μs) which travel via an emitting antenna toward a receiving antenna connected to the surface wave sensor dubbed hereinafter in the description, SAW sensor.

A favored band of frequencies for systems of this type is the ISM band, the acronym standing for "Industrial, Scientific, Medical" having as central frequency a frequency of 433 megahertz and a bandwidth of 1.7 megahertz.

Generally a remotely interrogatable SAW sensor and its interrogation system can comprise, as illustrated in FIG. 1 in the simplified case of a single transducer:
  an interrogation system 2;
  at least one resonator 1 comprising:
    an antenna 100;
    a transducer with interdigital electrode comb 11 and an SAW resonant cavity 13 characterized by its central frequency F and its quality factor Q, corresponding to the ratio between the central frequency and the pass-band width. The cavity 13 comprises two series of reflectors regularly spaced apart by a distance d. The transducer is connected to the antenna 100.

The interrogator 2 dispatches a long radiofrequency pulse to charge the resonator 1. When the emission stops, the resonator discharges on its natural resonant frequency with a time constant τ equal to $Q/\pi F$. This discharge of the resonator constitutes the return echo detected by the receiver of the interrogator. A spectral analysis thereafter makes it possible to work out the frequency of the resonator which constitutes its identification. This analysis can be performed by algorithms based on the Fourier transformation, for example of FFT type, the acronym standing for Fast Fourier Transform. This type of processing by spectral analysis is particularly complex.

SUMMARY OF THE INVENTION

This is why the present invention proposes a novel interrogation procedure making it possible to simplify and lighten the processing to identify a resonant frequency. The procedure employed limits the number of frequencies interrogated in a given frequency band, which are necessary in identifying the position of a resonance of a resonator interrogated by RF link and thus leads to an improvement in the information refresh rate, or for a given refresh rate, makes it possible to limit the successive spectral lines outside of the band associated with the overly fast generation of successive radio pulses.

More precisely the subject of the invention is a method for interrogating a passive sensor comprising at least one piezoelectric resonator characterized in that it comprises the following steps:
  the identification of the characteristic width of the resonant frequency band of the resonator $\Delta f_{0S}$;
  the determination of a scan interval equal to a third of the measured bandwidth $\Delta f = \Delta f_{0S}/3$;
  a first series of three interrogation measurements with signals respectively at a first frequency $f_1$, at a second frequency $f_2$ and at a third frequency $f_3$ making it possible to define a first resonance value $Y_1$, a second resonance value $Y_2$ and a third resonance value $Y_3$;
  the determination by a parabolic fitting operation of the resonator response curve on the basis of said first, second and third resonance values, so as to calculate a first value of the frequency in real time ($f_{01}$) of the resonator.

According to a variant of the invention, the value of the frequency of the resonator is defined by the following equation:

$$f_{01} = f_2 + \Delta f/2 \cdot (Y_1 - Y_3)/(Y_1 + Y_3 - 2Y_2)$$

According to a variant of the invention, the first series of interrogation measurements is performed at three frequencies such that the first, second and third resonance values define an isosceles triangle.

According to a variant of the invention, the method furthermore comprises a second iterative step of interrogation measurements at a fourth frequency $f_4$, a fifth frequency $f_5$ and sixth frequency $f_6$ defined respectively by the following equations:

$$f_4 = f_{01} - \Delta f$$

$$f_5 = f_{01}$$

$$f_6 = f_{01} + \Delta f$$

so as to refine a second frequency value in real time $f_{02}$.

The subject of the invention is also an electronic device for interrogating a passive sensor comprising at least one piezoelectric resonator, said device comprising at least one first assembly for generating radiofrequency signals, a second electronic assembly for processing radiofrequency signals and at least one passive sensor characterized in that the second assembly for processing radiofrequency signals comprises a micro-controller implementing the method of interrogation of the invention.

According to a variant of the invention, the device furthermore comprises an analog/digital converter.

The subject of the invention is also the use of the electronic device of the present invention for the interrogation of a passive sensor integrated into a system placed in rotation.

Indeed, the interrogation method of the invention is particularly well suited to passive sensors in motion since, when the sensor is in motion, the time of vision of the sensor by the antenna of the interrogator is brief and it is sought particularly to decrease the number of measurements.

According to a variant of the invention, the passive sensor being integrated into a wheel, the electronic interrogation device comprises means for determining the temperature of the wheel on the basis of the measurement of the resonant frequency in real time of said resonator.

According to a variant of the invention, the passive sensor being integrated into a wheel, the electronic interrogation device comprises means for determining the pressure of the wheel on the basis of the measurement of the resonant frequency in real time of said resonator.

BRIEF DESCRIPTION OF THE DRAWINGS

The invention will be better understood and other advantages will become apparent on reading the description which follows given without limitation and by virtue of the appended figures among which:

FIGS. 3a and 3b illustrate the deviation existing between the resonance curve of a resonator as a function of frequency and a parabolic approximation of said resonance as a function of frequency;

FIG. 6a presents the raw measurements of the two resonances of a temperature sensor and FIG. 6b provides the difference between reference frequency and measurement frequency, depending on whether the sensor is rotating or is stationary.

DETAILED DESCRIPTION

Generally the present invention proposes a method for interrogating a passive sensor comprising at least one resonator whose resonant frequency is characteristic of a physical quantity that one seeks to measure in real time. This may involve for example a physical quantity such as a temperature or a pressure.

According to the invention, use is made of at least one piezoelectric resonator that can advantageously be a surface acoustic wave resonator exhibiting by dint of its design a predefined and constant resonance bandwidth $\Delta f_{OS}$, and a resonant frequency which may vary according to the environment in which the sensor is immersed and that the present method of interrogation seeks to measure in real time.

Figure 1:
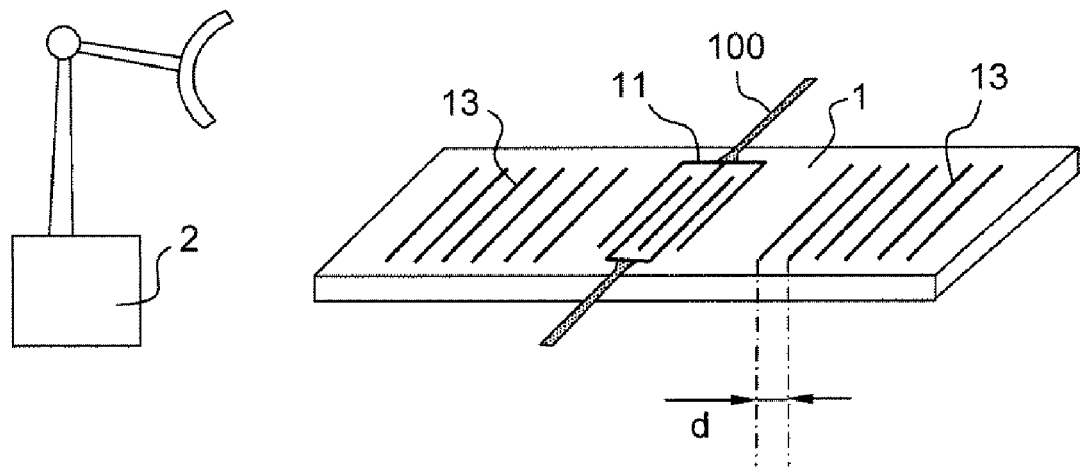
FIG. 1 illustrates the principle of interrogating an SAW sensor according to the known art.
Figure 2:
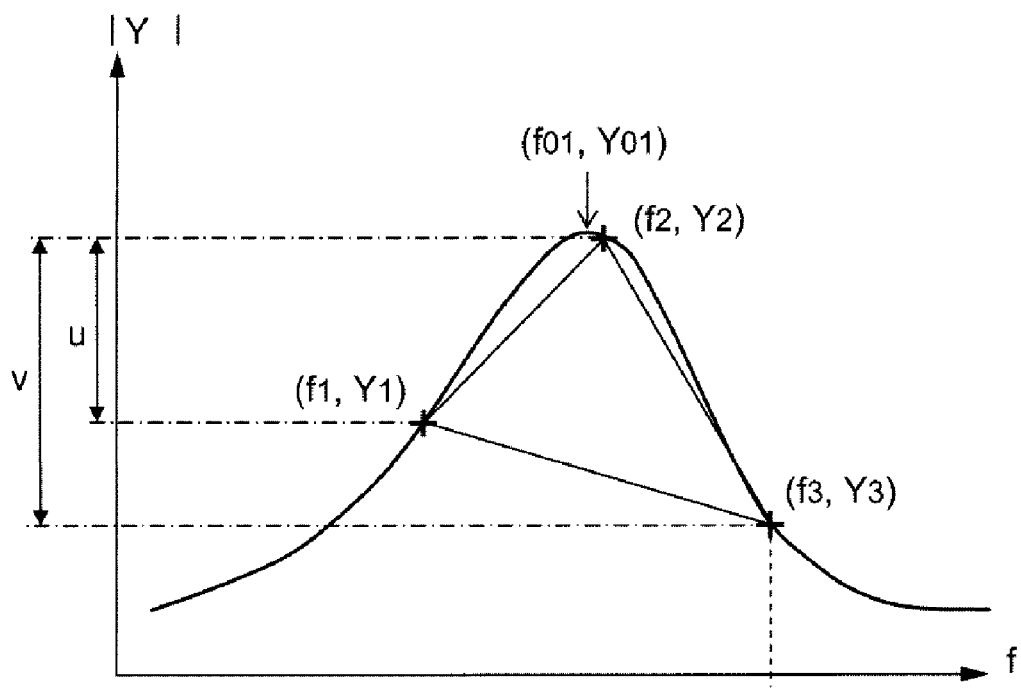
FIG. 2 illustrates the measurement points carried out according to a step of the method for interrogating a passive sensor, according to the invention.

For this purpose, the determination of three measurements of coefficient of reflection of the interrogated resonator is undertaken initially through a frequency range defined by an interval of $\Delta f = \Delta f_{OS}/3$, leading to the determination of values $Y_1$, $Y_2$ and $Y_3$ respectively for frequencies $f_1$, $f_2$ and $f_3$, in three bands of frequencies of bandwidth $\Delta f$, said frequencies being defined in such a way that:

$$f_1 - f_2 = f_3 - f_2 = \Delta f$$

and $Y_2 \geq Y_1$ and $Y_2 \geq Y_3$, as represented in FIG. 2.

On the basis of these three measurements one seeks to determine the frequency $f_{01}$ for which Y is a maximum.

The curve for the dependency of the resonance Y as a function of frequency is a resonance type curve modeled by an RLC circuit.

According to the method of the invention, this curve is approximated by a parabola. This leads to the consideration that the reflection coefficient follows a parabolic law as a function of frequency f and obeys an equation of the type:

$$y = af^2 + bf + c;$$

from which it may be deduced that:

$$f_{01} = f_2 + \Delta f/2 \cdot (Y_1 - Y_3)/(Y_1 + Y_3 - 2Y_2)$$

It should be noted that the above equation requiring only a division, a multiplication and three sums, its implementation in a micro-controller only doing calculations on integers, does not pose any difficulty.

The uncertainty which stems therefrom in the position of $f_{01}$ can be defined as follows:

$$d(f_{01} - f_2) = \Delta f/(u+v)^2 \cdot (|v|du + |u|dv)$$

with $u = Y_1 - Y_2$ and $v = Y_3 - Y_2$ du and dv being the uncertainties in these values associated with their measurement.

If it is assumed as a first approximation that $u \approx v$ and that $du = dv$ is determined by the resolution of analog-digital conversion or the noise of the radio power detector, then the above formula can be simplified as follows:

$$d(f_{01} - f_2) \approx du/2|u| \cdot \Delta f$$

Indeed, it may be noted experimentally that having regard to the precision of the analog-digital conversion, the last bit seems significant and therefore the measurement precision in u and v is determined today by the quantization interval.

It is thus apparent that a good compromise needs to be defined between an interval $\Delta f$ that is small enough to provide good precision in frequency and guarantee that the three points lie on the resonance spike, that is to say satisfy the following condition: $\Delta f < f_{01}/Q$ with Q quality factor, while maximizing $|u|$ since du is fixed and imposed by the measurement system.

We note that the previous calculation is based on the assumption of the validity of a parabolic approximation of the resonance, second order Taylor expansion which can be correct only locally around the resonance.

The applicant has verified that the deviation between the parabola and the Gaussian deviates by less than 5% when we confine ourselves to a width of $\Delta f_{01}/3$ i.e. a third of the resonance width, around the peak of the Gaussian, by considering that the resonance is modeled as a Gaussian with standard deviation $\Delta f_{01}$. This conclusion is illustrated in FIGS. 3a and 3b, FIG. 3b representing an enlargement of the frequency band at the peak of the response curve of the real RLC circuit.

According to a complementary step of the interrogation method of the invention, a refinement of the determination of the resonant frequency can be undertaken subsequently by repeating the process.

That is to say that three resonance values Y are measured again, this time on the basis of the value $f_{01}$ supplemented with measurements at frequencies $f_{01}-\Delta f$ and $f_{01}+\Delta f$, so as to determine a more accurate resonant frequency $f_{02}$, in the same manner by determination on the basis of three points and of a parabolic approximation.

Figure 4:
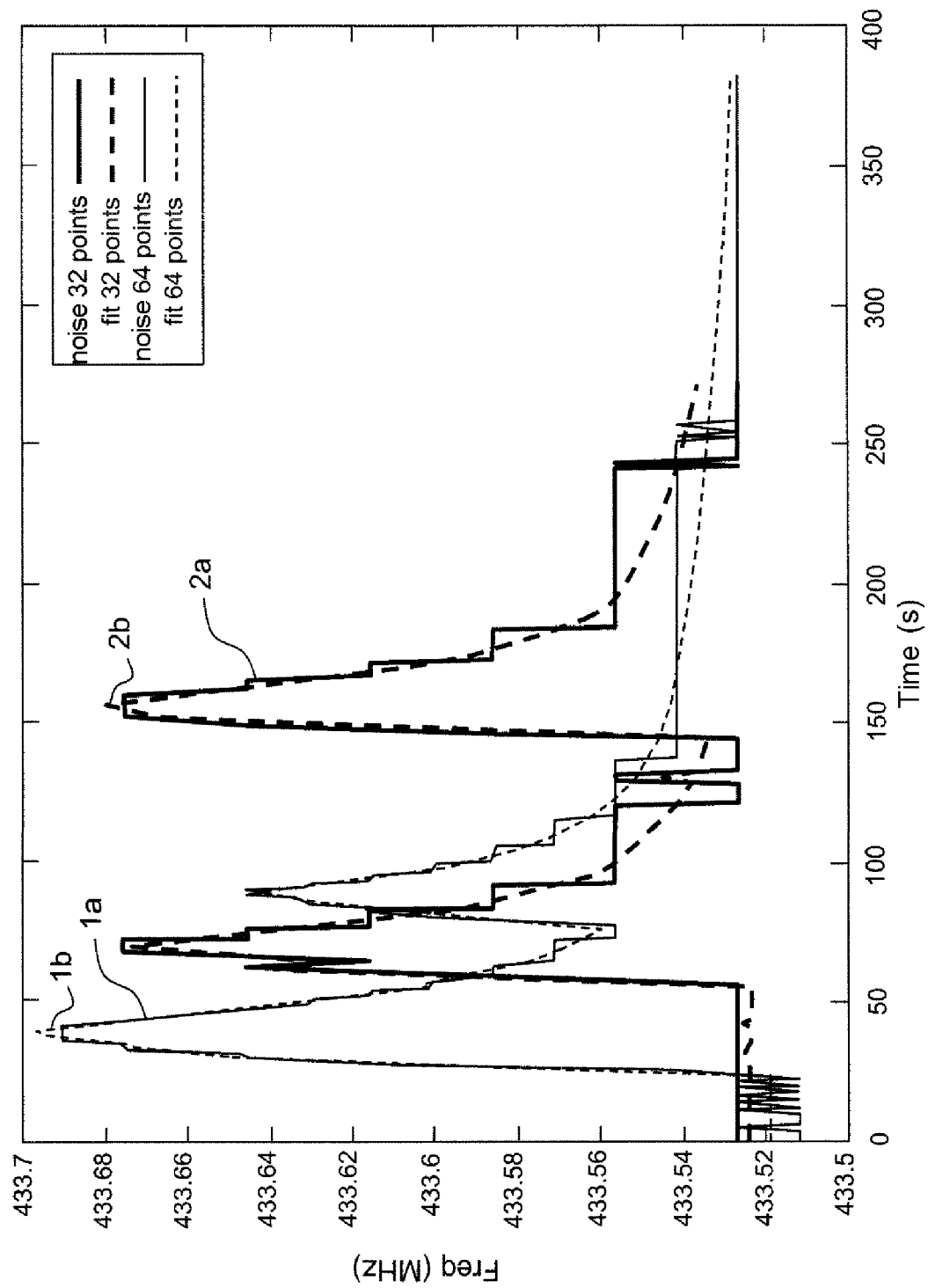
FIG. 4 illustrates comparative results obtained with a method of interrogation of the known art and the method of the invention in the case of the evolution of the resonant frequency as a function of the rise in temperature of said resonator.

By way of illustration, measurements were performed with different intervals of frequencies $\Delta f$ of one and the same resonator exhibiting a quality factor Q of a few thousand in a search for temperature dependence of the resonant frequency of a resonator integrated into a passive sensor. FIG. 4 shows the results obtained and comparative results between those resulting from an interrogation method of the known art and those resulting from the interrogation method of the invention. The method of the known art comprises the scanning of the frequency band, typically the ISM band in intervals of $\Delta_{f0}$ and therefore the set of resonance values Y obtained for the set of measured frequencies. The method of the invention comprises the operation of parabolic fitting with an extremely restricted number of measurements.

To accomplish this comparison, a resonator is heated and the evolution of the resonant frequency is determined as a function of the temporal evolution of the temperature of said resonator.

Curves 1a and 2a relate to the measurements obtained by a simple search for a maximum subsequent to a scan of the ISM band in intervals of $\Delta_{f0}$, curves 1b and 2b relate to the measurements deduced from a parabolic fitting operation. It emerges from this comparison that the operation of searching for a parabolic maximum leads to much better accuracy.

In conclusion, the method of the invention thus makes it possible on the basis of a measurement of six points to accurately determine a value in real time of the resonant frequency of a resonator integrated into a remotely interrogatable passive sensor.

Figure 5:
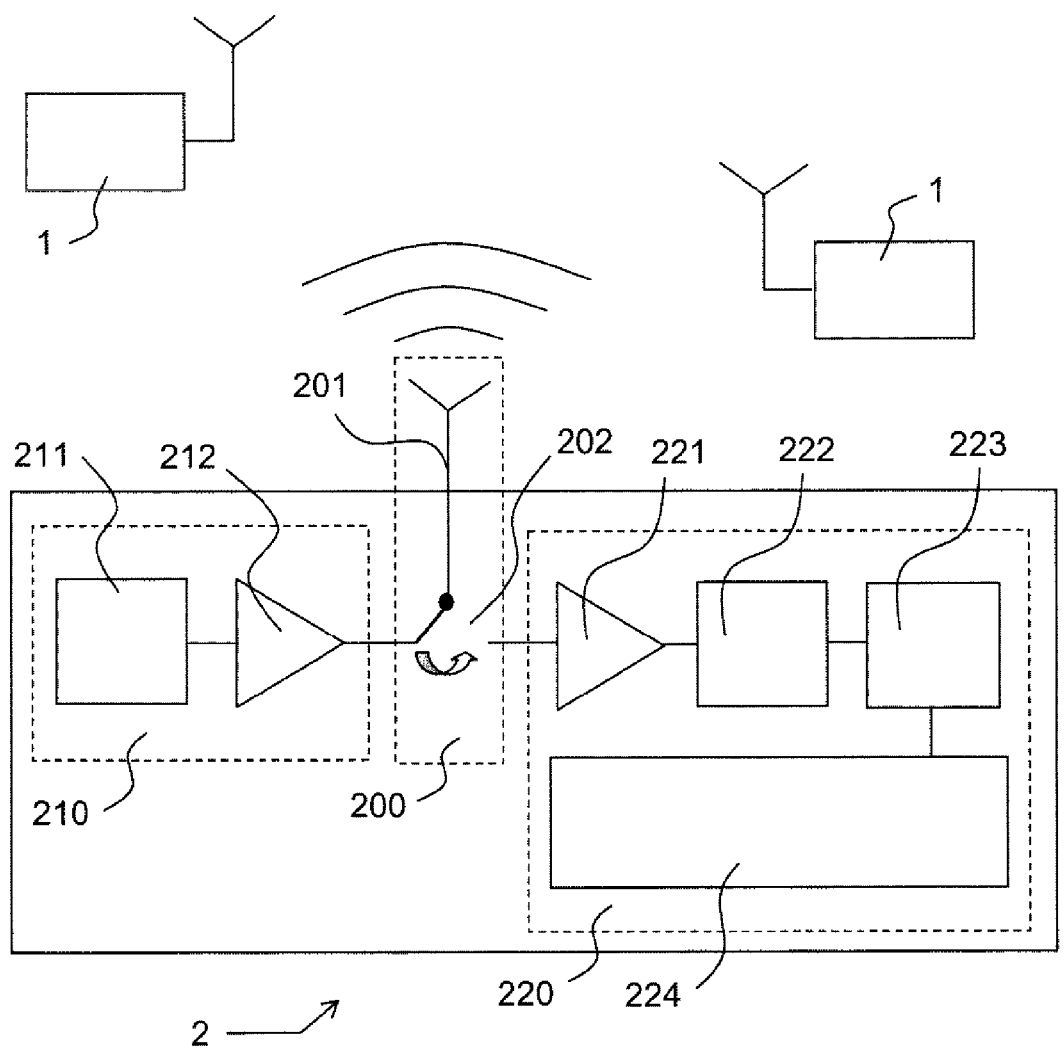
FIG. 5 illustrates an exemplary device making it possible to implement the method of remote interrogation of the invention.

FIG. 5 illustrates an exemplary device making it possible to implement the method of remote interrogation of the invention.

The electronic remote interrogation device comprises at least:
a first electronic assembly for generating radiofrequency signals 210;
a second electronic assembly for processing radiofrequency signals 220;
an emission/reception assembly 200 for emitting/receiving the radiofrequency signals comprising a common so-called emission/reception antenna 201 and electronic control means 202;
and at least one resonator 1.

The first signal generation electronic assembly 210 comprises frequency synthesis electronic means 211 and electronic amplification means 212. The electronic means 211 making it possible to generate a signal at a variable emission frequency lying in the spectral band of the resonator. The frequency synthesis covers the frequency band of the envisaged application with an interval of $\Delta f_{0s}/3$.

The radiofrequency signal generated can be amplitude modulated, the amplitude modulation being at a variable emission frequency lying in the spectral band of the transponder. By way of example, the temporal shaping of the emission signal can be a 100% amplitude modulated carrier of "OOK" type, the acronym standing for "On-Off Keying".

The duration T of the pulse emitted is long enough to allow the response of the SAW resonator to attain its steady state at the end of emission. Thus, at the end of interrogation, the response of the resonator is equivalent to its harmonic response. Consequently, the duration T is substantially greater than the ratio of the overvoltage coefficient Q of the resonator to its central frequency $f_0$. In practice, the duration T is chosen such that T is greater than $3Q/\pi f_0$. For example, for a frequency of 433 megahertz, taken from the ISM band and for an overvoltage coefficient Q of 5000, the duration T must be greater than 11 microseconds.

The first electronic assembly for generating radiofrequency signals 210 and the second electronic assembly for receiving radiofrequency signals 220 have a common so-called emission/reception antenna 201 and electronic control means 202 making it possible to guide the signal of the first electronic assembly for generating signals toward said antenna 201 and to guide the reception signal of said antenna toward the second reception and processing electronic assembly 220. The control is symbolized in FIG. 5 by a semi-circular arrow.

The second electronic assembly for receiving radiofrequency signals 220 comprises means of amplification and detection of amplitude of the signal received 221, sampling means 222 and electronic processing means 224 making it possible to determine the amplitude. It is therefore only necessary to know the power received for each emitted frequency of the signals received. The second electronic assembly 220 for receiving radiofrequency signals can also comprise at least one analog/digital converter 223 making it possible to ensure the digital signal processing. The processing of the data is carried out in a digital manner by virtue of a micro-controller. It should be noted that any micro-controller ensuring multiplication and division on 32 bits makes it possible to implement the algorithm required for the interrogation method of the invention.

We shall describe hereinafter an application in which a passive sensor is integrated into a wheel and more precisely into the tire of a wheel for which one wishes to be able to evaluate the heat-up temperature and/or the pressure of said tire. Typically, in the case of a wheel in motion, for a rotation at 3000 revolutions/min and a viewing angle of 60 degrees, the viewing time is 3.3 ms. It is necessary, in this time span, to interrogate all the resonance spikes of the SAW sensor. In the case of a scan of 64 points/spike (typical case having regard to the customary quality factors of 8000 at 433 MHz), a time of 26 μs is required, which is less than the emission time of the radiofrequency wave so that its spectral footprint is less than the mid-height bandwidth of the resonator. The objective envisaged with the interrogation method of the invention is to perform the fewest possible measurements so as to be able to interrogate sensors traveling briefly past the antenna of the interrogator.

To validate the interrogation method of the invention, a passive sensor comprising at least one resonator is positioned in a wheel 12 cm in radius revolving at a speed of 3000 revolutions/minute. One of the resonators serves as reference. The objective of the reference is to undergo the same constraints/effects of the environment as the measurement resonator, therefore the reference resonator is placed as close as possible to the measurement resonator: in the present case, they are both placed in the same component. Measurements have been performed according to a conventional interrogation method and according to the method of the invention. The results of these measurements are illustrated in FIG. 6. FIG. 6a presents the raw measurements of the two resonances of a temperature sensor—the reference spike denoted R situated at the top and the measurement spike situated at the bottom—on a wheel rotating at 3000 revolutions/min (time 0-30000, 78000 to 95000, 115000 to 135000) or not. We do not find, in FIG. 6b, which gives the difference between reference frequency and measurement frequency, any appreciable variation in variance of the measurement depending on whether the sensor is rotating or is stationary. The proposed algorithm therefore makes it possible to maintain the number of averages (here 10) guaranteeing the variance of the measurement, here less than a degree C. The same measurement with a scan algorithm on 2×32 points considerably worsens the number of averages performed when the wheel is rotating, therefore increasing the variance in the measured temperature.

The measurements are performed with an ISM bandwidth of 1.9 MHz divided into 128 points which is the power of 2 which comes closest to a third the bandwidth of the resonator whose quality factor is 8000. A measurement accuracy of better than a kHz is obtained.

The invention claimed is:

1. A method for interrogating a passive sensor having at least one piezoelectric resonator, the method comprising the following steps:
    identifying, via an electronic assembly, a characteristic width of a resonant frequency band of the at least one piezoelectric resonator $\Delta f_{0S}$;
    determining, via the electronic assembly, a scan interval equal to a third of the identified characteristic bandwidth $\Delta f = \Delta F_{0S}/3$;
    defining, via the electronic assembly, a first resonance value ($Y_1$), a second resonance value ($Y_2$) and a third resonance value ($Y_3$) based at least in part on a first series of three interrogation measurements, respectively, at a first frequency ($f_1$), at a second frequency ($f_2$) and at a third frequency ($f_3$);
    determining, via the electronic assembly using a parabolic fitting operation of a resonator response curve, a first value of a frequency in real time ($f_{01}$) of the at least one piezoelectric resonator based at least in part on the first, second and third resonance values.

2. The method for interrogating a passive sensor as claimed in claim 1, wherein the scan interval is constant and that the first value of the frequency of the at least one piezoelectric resonator is defined by the following equation:

$$f_0 = f_2 + \Delta f/2 \cdot (Y_1 - Y_3)/(Y_1 + Y_3 - 2Y_2).$$

3. The method for interrogating a passive sensor as claimed in claim 1, wherein the first series of interrogation measurements is performed at the first, second and third frequencies such that the first, second and third resonance values define an isosceles triangle.

4. The method for interrogating a passive sensor as claimed in claim 1, further comprises a second iterative step of interrogation measurements at a fourth frequency ($f_4$), a fifth frequency ($f_5$) and sixth frequency ($f_6$) defined respectively by the following equations:

$$f_4 = f_{01} - \Delta f$$

$$f_5 = f_{01}$$

$$f_6 = f_{01} + \Delta f$$

so as to refine a second frequency value in real time ($f_{02}$).

5. An electronic device for interrogating a passive sensor comprising at least one piezoelectric resonator, said electronic device comprising at least one first assembly for generating radiofrequency signals, a second electronic assembly for processing the radiofrequency signals and at least one passive sensor wherein the second electronic assembly for processing the radiofrequency signals comprises a microcontroller implementing the method of interrogation as claimed in claim 1.

6. The electronic device as claimed in claim 5, further comprises an analog/digital converter.

7. The electronic device as claimed in claim 5, wherein the passive sensor is integrated into a system placed in rotation and interrogated by the electronic device.

8. The electronic interrogation device as claimed in claim 5, wherein the passive sensor is integrated into a wheel and further comprising at least one resonator, and means for determining a temperature of the wheel based on the measurement of the resonant frequency in real time of said at least one piezoelectric resonator.

9. The electronic interrogation device as claimed in claim 5, wherein the passive sensor is integrated into a wheel and further comprising at least one resonator and means for determining a pressure of the wheel based on the measurement of the resonant frequency in real time of said at least one piezoelectric resonator.

* * * * *